Oct. 12, 1965    J. S. ECKERT    3,210,914

FUME SCRUBBER

Filed Feb. 4, 1963

INVENTOR.
JOHN S. ECKERT

BY

ATTORNEY 3,210,914
FUME SCRUBBER
John S. Eckert, Silver Lake, Ohio, assignor to The United States Stoneware Company, Tallmadge, Ohio, a corporation of Ohio
Filed Feb. 4, 1963, Ser. No. 255,755
5 Claims. (Cl. 55—90)

This invention relates to a fume scrubber and its use. It is designed primarily for the removal of suspended particles from industrial gases.

It is recognized that when a gas is washed in a tower with concurrent flow of a washing liquid down through a bed of packing, the subsequent removal of liquid spray particles from the gas is difficult. However, such concurrent flow of the gas and liquid is desirable because of the intense interaction between the liquid and the gas due to the repeated deflection in the direction of flow of both produced by the packing. The high-capacity scrubber of this invention takes advantage of all of the benefits of such concurrent flow, and the liquid particles entrained in the gas are removed by subsequent upward flow thereof through a second bed of packing where removal is effected by impingement of the gases against the packing. The concurrent flow in the first bed of packing, takes advantage of the high mass transfer from the gas to the liquid of the entrained solid particles and whatever components there may be in the gas which are soluble in the liquid, followed by the efficient removal of the entrained liquid particles from the gas in the subsequent passage of the gas up through a second bed of packing.

The equipment is very compact and is preferably made of plastic or other light-weight material so that it can be hung right in a duct system without any special platform or other structural arrangement. It may, for example, be no more than 4 feet long, 3 feet high and 1 foot wide and yet handle as much as 1500 c.p.m. of a gas like air.

In the first bed in which the flow of the gas and liquid is concurrent, the flow of the gases is repeatedly broken by the baffling action of the packing elements, and this tends to bring entrained solid particles into contact with the packing elements which are washed with liquid separated from the gases. Also, soluble constituents in the gas are dissolved out into the liquid. This liquid already contains a portion of the suspended particles which the spray has contacted before it separates from the gas on to the packing elements in the first packed bed. As the liquid and gas pass concurrently through the bed intense turbulence takes place with such intermingling of the gas and liquid that the gas is very efficiently contacted. Most of the liquid separates from the gas, as it leaves the bottom of the bed.

The gases then pass up through the second packed bed. In this bed, most or all of the entrained liquid particles are removed from the gas, and the countercurrent flow of the separated liquid down through the bed tends to remove all of the entrained spray particles and the remaining solid particles. The cross-sectional area of this second bed is larger, so that the speed of the gases is reduced permitting the entrained liquid to separate on the packing and drain down through it.

By using the concurrent-countercurrent flow principle, by first passing gases and a washing liquid concurrently down through one bed, and then passing the resulting gases up through another bed countercurrently to the downward flow of the separated liquid therethrough, the improved scrubber of this invention takes advantage of the high scrubbing performance of a packed tower at a great decrease in size. For instance, a scrubber of the design disclosed herein which measures 1 foot wide by 3 feet high and 3 or 4 feet long will handle 1500 cubic feet per minute of gas at a pressure drop of less than six inches of water. A countercurrent tower scrubber approaching equivalent capacity would be 30 inches in diameter by 8 feet high, but it would not remove as high a percentage of fine solids as the improved scrubber, such as those less than 3 microns in the largest dimension.

The invention is further described in connection with the accompanying drawings, in which—

Figure 1:
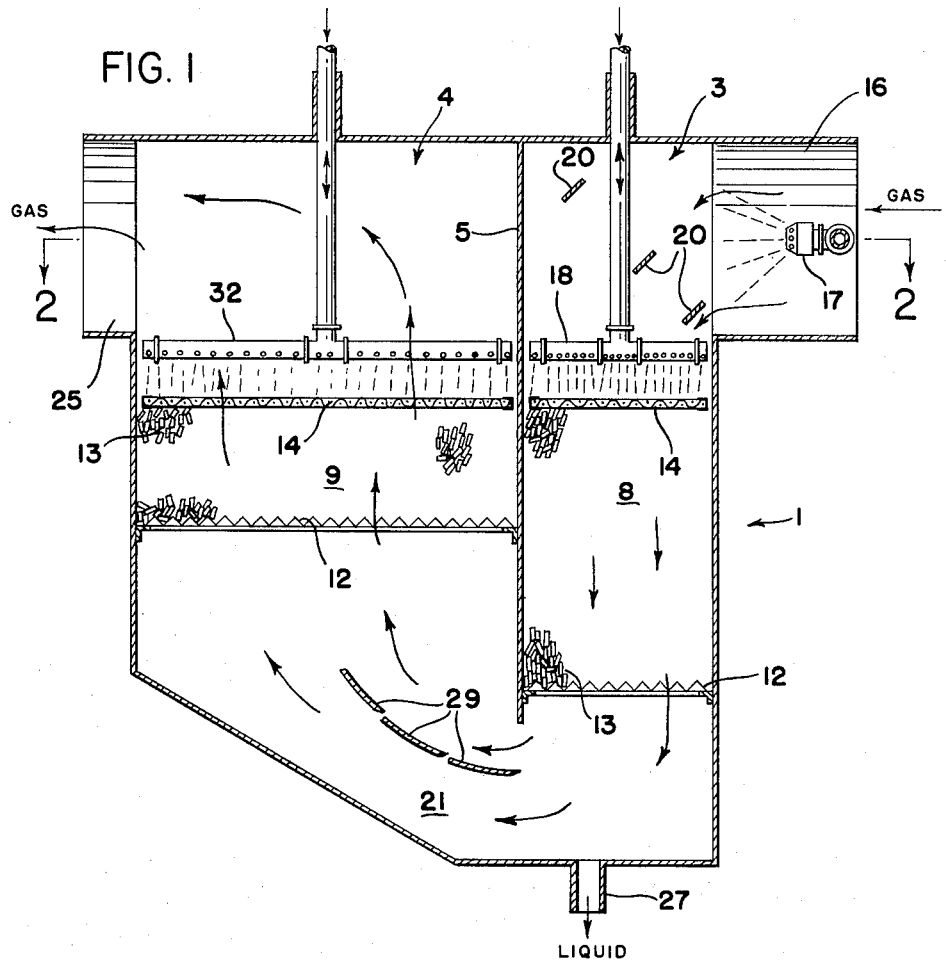
FIGURE 1 is a vertical section through the scrubber.
Figure 2:
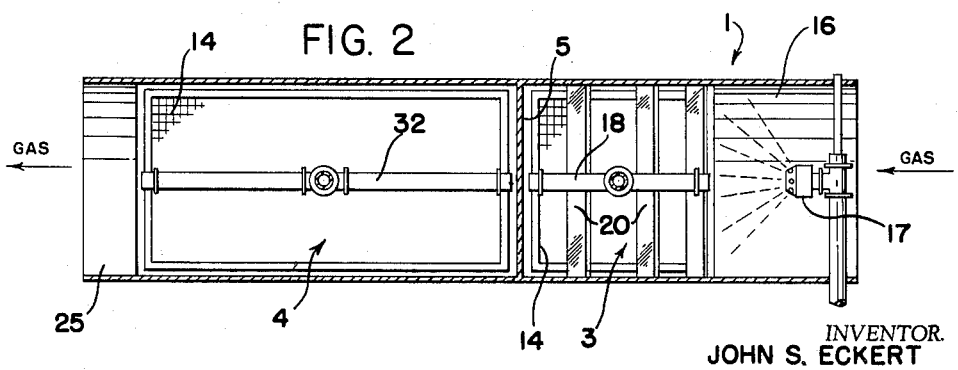
FIGURE 2 is a plan view of the scrubber.

The scrubber 1 is divided into two adjacent chambers 3 and 4 by the partition 5. The partition does not extend to the bottom of the scrubber.

The packed beds 8 and 9 in the chambers 3 and 4, respectively, are of any usual construction. They are each shown as comprising a support plate 12, packing elements (which may be saddles, rings, or even checkerwork, etc.) 13 and a hold-down plate 14. The cross-sectional area of the bed 9 is much greater than that of the bed 8 and may, as shown, have twice the area.

The gas passes through entrance conduit 16 into chamber 3 above the packed bed 8 and is sprayed with water or other liquid before it reaches this bed. It may be initially sprayed through the spray 17, but usually spraying through the distributor 18 is adequate. The baffles 20 prevent stratification of the gas as it passes down through the bed. Thus, as the gas passes down through the packed bed 8, the liquid and gas are turbulently mixed and pass down through the bed concurrently.

The support plates 12 for the beds 8 and 9 may be omitted by filling the bottom 21 with packing along with sections 8 and 9.

From the bed 8 the gas passes through the connecting chamber 21 into the bottom of the bed 9. This bed is much larger in area than the bed 8 so that the speed of the gases is radically reduced as they pass through this bed. Thus, the bed 9 serves basically as a means for removing entrained liquid particles from the gas. The separated liquid passes down through the bed countercurrent to the gas. The gas then passes out through the exit conduit 25. All or most of the entrained solid and liquid particles are separated from the gases in the packed beds, and are washed from these beds by the liquid which collects in the bottom of the chamber 21 and drains away through the outlet 27. (Outlet 27 is baffled to prevent pieces of packing from blocking it when chamber 21 is filled with packing elements.) Plates 29 are directing baffles which prevent the gas from channeling as it passes up through the bed 9.

The irrigation line 32 is used from time to time to back-wash the bed 9 to clean it out once it has become fouled.

To illustrate the operation, reference is had to scrubbing a mixture of air and fine dust in equipment such as shown. In the scrubber, the bed 8 measured about 12 inches square and was about 21 inches deep, and the bed 9 measured about 12 x 24 inches and was 8 inches deep. Each bed was filled with 1½-inch Pall Rings (a product of the United States Stoneware Company). The spray 18 and distributor 19 delivered a total of 25 gallons of water per minute. Sixteen hundred cubic feet of gas were treated per minute. This gas carried about one ounce of solid particles per cubic foot, the particles each measuring about 1 to 50 microns with a content of at least 5 percent of particles by weight measuring 3 microns or smaller. It was washed so thoroughly in the scrubber that the exit gas contained no more than 1 percent of the original particles by weight content. Ammonia was removed in the scrubber with over 99 percent efficiency. The gas passing through the connecting chamber 21 carried some liquid spray from the bottom of the bed 8 into the bottom of the bed 9, but the gas leaving the scrubber through exit conduit 25 was substantially free from spray.

The invention is covered in the claims which follow.

What I claim is:

1. The method of separating solid particles from a gas which comprises blowing the gas down through a first packed bed at a given rate of speed, and washing it concurrently with a liquid therein and thereby washing some of said solid particles therefrom, then blowing the gas with entrained liquid particles and the balance of said solid particles therein up through a tower containing a second packed bed and having an open space thereabove at least the bottom of which open space is substantially coextensive with the area of the top of said second bed, at a substantially lower rate of speed and separating said entrained liquid and solid particles from the gas in said second bed and intermittently washing them down through the second bed countercurrent to the upward flow of gas therethrough, the top of the second bed having at least substantially the cross-sectional area of the bottom thereof.

2. The method of claim 1 in which the liquids from said beds are combined and removed from the operation together.

3. A fume scrubber which includes a first packed bed, means for blowing a gas down into said bed, a tower with a second packed bed in the bottom thereof and a gas space above the bed in the tower, the area of the bottom of the gas space being at least substantially as great as the top of said second bed, the second packed bed being of substantially greater cross-sectional area than the first bed, the top of the second bed having at least substantially the cross-sectional area of the bottom thereof, means for conveying the gas from the bottom of said first bed to the bottom of the second packed bed, means for spraying a liquid into the means for conveying the gas to the first packed bed so that the gases and such spray enter said first bed concurrently, and means for conveying gas away from the gas space.

4. The scrubber of claim 3 in which the two beds are side by side on substantially the same level, a chamber connects the bottoms of the two beds, under the half of the second bed adjacent the first bed there is located means for catching liquid drained from said half of the bed, and liquid drained from the other half of the second bed is drained to the bottom of the chamber which connects the beds.

5. The scrubber of claim 4 in which the beds are of the same width, a wall separates the beds, and the second packed bed has substantially twice the area of the first packed bed.

References Cited by the Examiner

UNITED STATES PATENTS

| Re. 18,328 | 1/32 | Fedeler | 55—96 |
| 531,779 | 1/95 | Cook | 55—259 |
| 902,958 | 11/08 | Galusha | 55—233 |
| 2,008,800 | 7/35 | Somers | 55—233 X |

FOREIGN PATENTS

| 117,114 | 6/43 | Australia. |
| 519,925 | 5/53 | Belgium. |

REUBEN FRIEDMAN, *Primary Examiner.*